(12) United States Patent
Youngs

(10) Patent No.: US 8,458,057 B1
(45) Date of Patent: Jun. 4, 2013

(54) MEETING COST ACCOUNTING AND ANALYSIS SYSTEM AND METHOD

(76) Inventor: Rita Ann Youngs, Minnetonka, MN (US)

( * ) Notice: Subject to any disclaimer, the term of this patent is extended or adjusted under 35 U.S.C. 154(b) by 602 days.

(21) Appl. No.: 12/505,699

(22) Filed: Jul. 20, 2009

Related U.S. Application Data

(60) Provisional application No. 61/082,547, filed on Jul. 22, 2008.

(51) Int. Cl.
*G06F 15/02* (2006.01)

(52) U.S. Cl.
USPC .......................................................... 705/32

(58) Field of Classification Search
USPC .................... 705/7.12, 7.13, 7.19, 28, 30, 32, 705/400, 7, 19, 34, 7.28
See application file for complete search history.

(56) References Cited

U.S. PATENT DOCUMENTS

| | | | | |
|---|---|---|---|---|
| 4,445,181 A * | 4/1984 | Yatman | ........................... | 705/418 |
| 6,119,109 A * | 9/2000 | Muratani et al. | ............... | 705/400 |
| 6,220,512 B1 * | 4/2001 | Cooper | .......................... | 235/382 |
| 6,324,517 B1 * | 11/2001 | Bingham et al. | .............. | 705/7.24 |
| 6,324,528 B1 * | 11/2001 | Hillson et al. | ................. | 705/400 |
| 6,378,771 B1 | 4/2002 | Cooper | | |
| 7,117,161 B2 * | 10/2006 | Bruce | ........................... | 705/7.26 |
| 7,343,312 B2 * | 3/2008 | Capek et al. | ................. | 705/7.19 |
| 7,734,517 B2 * | 6/2010 | Hurewitz | ........................ | 705/35 |
| 7,774,221 B2 * | 8/2010 | Miller et al. | ................... | 705/7.19 |
| 7,822,628 B2 * | 10/2010 | Brady et al. | .................. | 705/7.13 |
| 7,877,282 B2 * | 1/2011 | Brady et al. | .................. | 705/7.12 |
| 7,929,678 B2 * | 4/2011 | Shaffer et al. | ............. | 379/202.01 |
| 7,970,666 B1 * | 6/2011 | Handel | ........................... | 705/28 |
| 2003/0188264 A1 | 10/2003 | Nawathe et al. | | |

\* cited by examiner

*Primary Examiner* — Andrew Joseph Rudy
(74) *Attorney, Agent, or Firm* — Sherrill Law Offices, PLLC

(57) ABSTRACT

An automated cost accounting reporting method for interdepartmental data tracking related to the cost of a business meeting, comprising the steps of: identifying individuals attending a business meeting, collecting data about the individual participants at the business meeting from a storage data base and loading the data into a process module, timing the duration of each individuals attendance at the meeting, calculating the cost of the business meeting per business unit based on the number of individuals in attendance, generating one or more currency cost reports from the calculations, transmitting one or more reports to a particular business unit to be displayed, and displaying the reports on a computer screen.

7 Claims, 8 Drawing Sheets

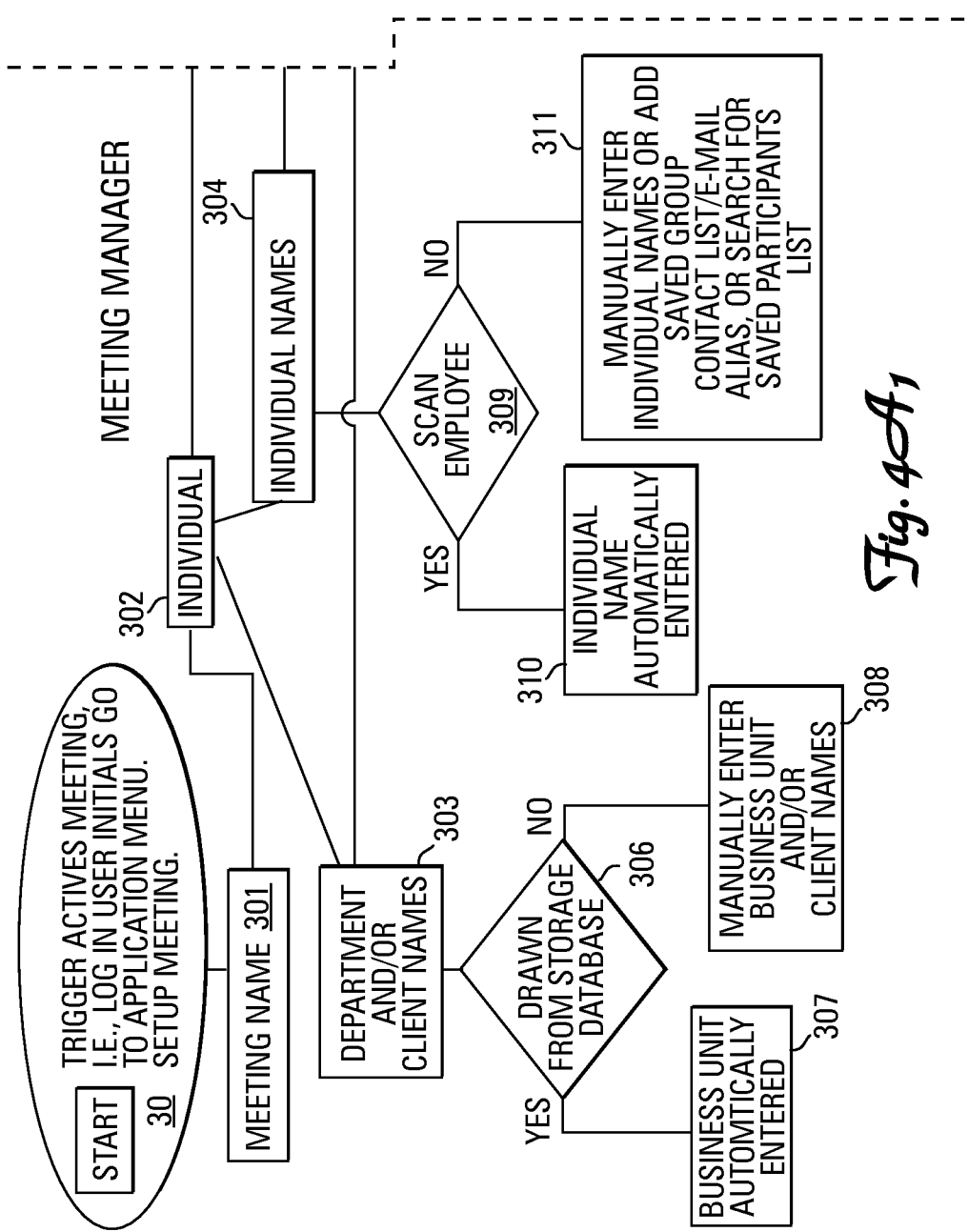
Fig. 4A₁

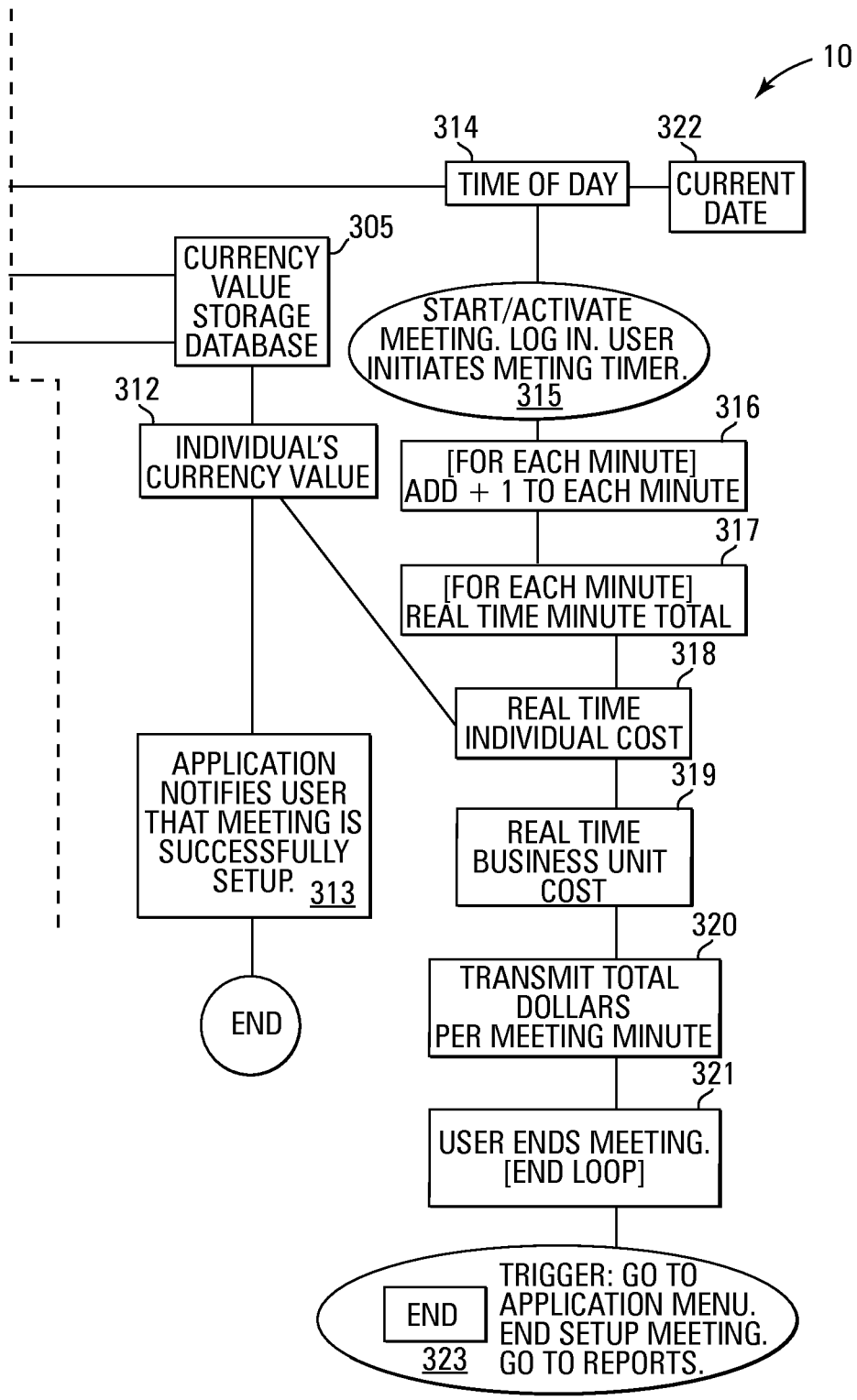
Fig. 4A₂

MEETING COST ACCOUNTING AND ANALYSIS SYSTEM AND METHOD

This application claims the benefit of U.S. Provisional Application No. 61/082,547, filed Jul. 22, 2008.

BACKGROUND

Business meetings are a frequent and necessary occurrence within a business or corporation. They serve as a platform to express ideas, concerns, strategy, current news or status updates. Oftentimes, the business meeting is the only forum for which persons from separate business divisions or departments are in the same location free discuss a variety of subjects. Such business meetings, although necessary, do cost the corporation or individual departments. An employee's attendance at a business meeting is valuable because of the information acquired, but also time spent at the given meeting. An employee's attendance at a business meeting financially costs the business in terms of lost time and lost productivity. An employee's cost of attendance at a particular meeting may be based on that person's pay scale, hourly fee, lost production or overall compensation. An employee's particular business unit within the corporation determines the employee's cost and bears the financial burden of that employee's attendance at the meeting. Businesses and corporations must determine if holding a business meeting will add real value to the company or if the potential benefits from the meeting outweighed by the cost to the individual business divisions.

Prior art discloses means for monitoring the cost of particular meetings, but do not report the cost to individual business units within the company. In large meetings, the overall cost of the meeting is of minimal importance because such dollar amounts have no link to a particular department budget, thus no way to show who or where the money is being spent. A need exists for an automatic, convenient means to monitor and record the individuals in attendance at a particular business meeting and what the cost to each individual business department is as a result of the individual's attendance at the given meeting.

SUMMARY OF THE INVENTION

The present claimed invention is directed to an automated cost accounting reporting method for allocating the cost of a meeting. The method comprises the steps of: a) obtaining data about individuals attending a meeting and loading the data into a process module, b) timing the duration of each identified individual's actual attendance at the meeting within a timing module, and c) calculating within the process module a cost of the business meeting per business unit. The cost is calculated by multiplying each identified individual's duration of attendance at the meeting by that individual's currency value per unit time to obtain an individual cost, and summing individual costs for all identified individuals from the same business unit to obtain a business unit cost. A cost report containing at least the business unit cost based on the duration of attendance of individuals assigned to that particular business unit is generated and transmitted to a display module, and displayed.

FIG. $4_A$ is a diagram showing the relationship between FIGS. $4_{A1}$ and $4_{A2}$.

FIG. $4_{A1}$ is a detailed flow diagram of a first embodiment wherein data is entered and the cost of an individual and business unit is calculated.

FIG. $4_{A2}$ is a continuation of the flow diagram of the first embodiment depicted in FIG. $4_{A1}$.

FIG. $4_B$ is a detailed flow diagram continuing from FIGS. $4_{A1}$ and $4_{A2}$ of the first embodiment wherein a cost report is generated, transmitted and displayed.

Figure 5:
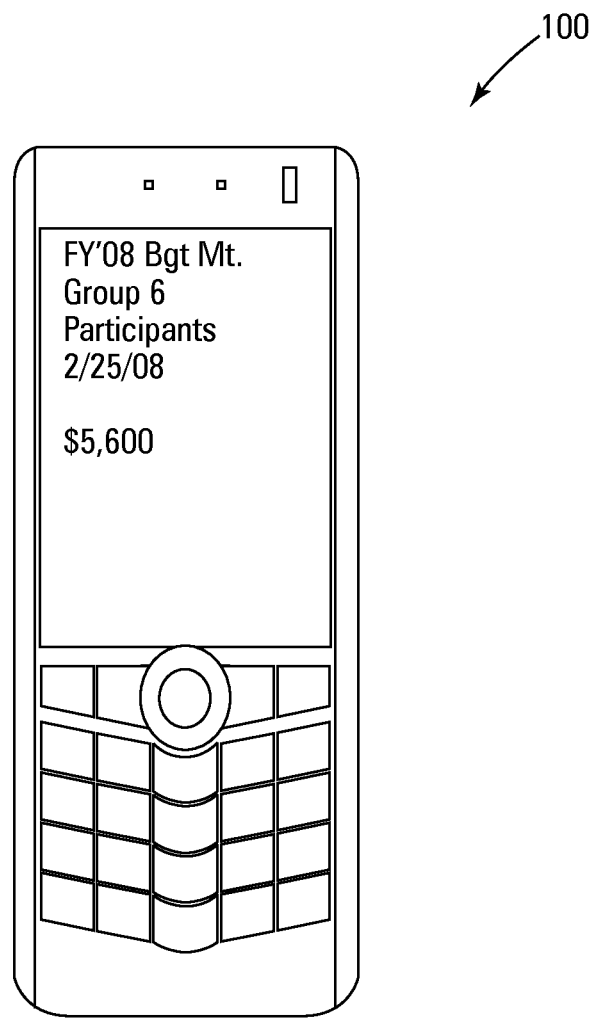

FIG. 5 depicts one example of a handheld device displaying the business meeting data on its computer screen.

DETAILED DESCRIPTION OF A PREFERRED EMBODIMENT

Referring to FIGS. $1$-$4_B$ the present invention 10 is a method for interdepartmental data tracking related to the cost of a business meeting. Data relating to individuals or groups participating at a meeting and the cost of each individual's participation is collected and recorded. Individuals are linked to specific business units through data stored within a main storage data base 20 or manually entered by a user. A process module 30 correlates the attendance, time and agenda data drawn from the meeting with the individual or group's cost at the meeting and linking them to a specific business unit. From the correlated data a specific department's cost of the meeting and an individual's cost are calculated. The process module 30 then generates specific cost reports dependent on each user or business unit's needs. The cost reports are formatted and distributed throughout the corporation and various departments may use the data to determine if the business meeting was an efficient, productive use of time.

Referring to FIGS. $1$-$4_B$, when the meeting data is successfully programmed the user may activate the meeting timer module 40. The clock will keep a cumulative minute total from the desired start time indicated by the user. Using the previous input data drawn from the storage database 30 or manually entered in the processor module 20 the timer will keep a cumulative minute total for the duration that each individual or group is in attendance at the meeting. In addition, the present invention 10 may track the time to prepare for the meeting and time after the meeting for follow-up or minutes. Examples may include: the time to prepare an agenda or presentation, coordinating a time and place, extending invites, securing the site or location, and tracking any out-of-pocket meeting expenses. Additional time spent after the meeting has concluded may include preparing minutes or follow-up assignments and could be factored into the overall cost of the meeting. The process module 30 may be able to store such information and add the cost to the calculated cost of the meeting to give a more accurate expense report.

Figure 1:
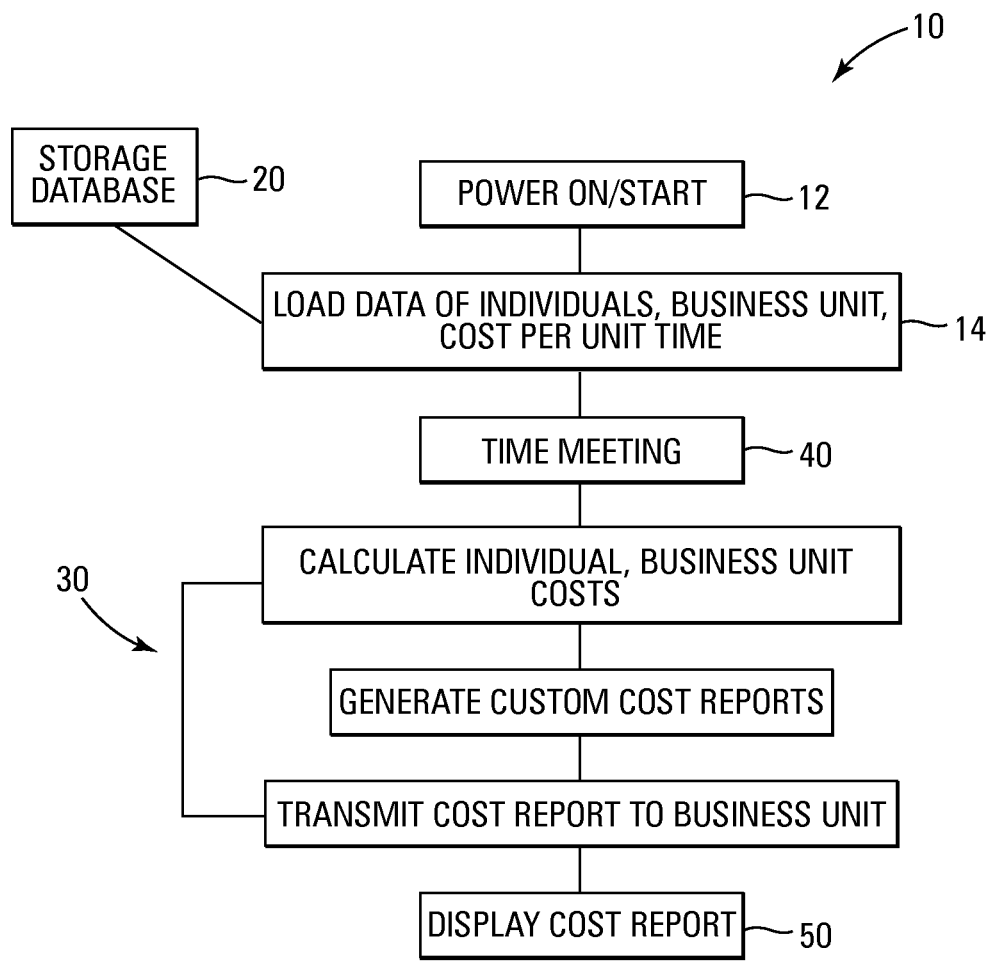
FIG. 1 is a flow diagram of the present invention depicting a method of retrieving data on an identified individual at a business meeting and calculating, transmitting and displaying the cost report of the business meeting.
Figure 2:
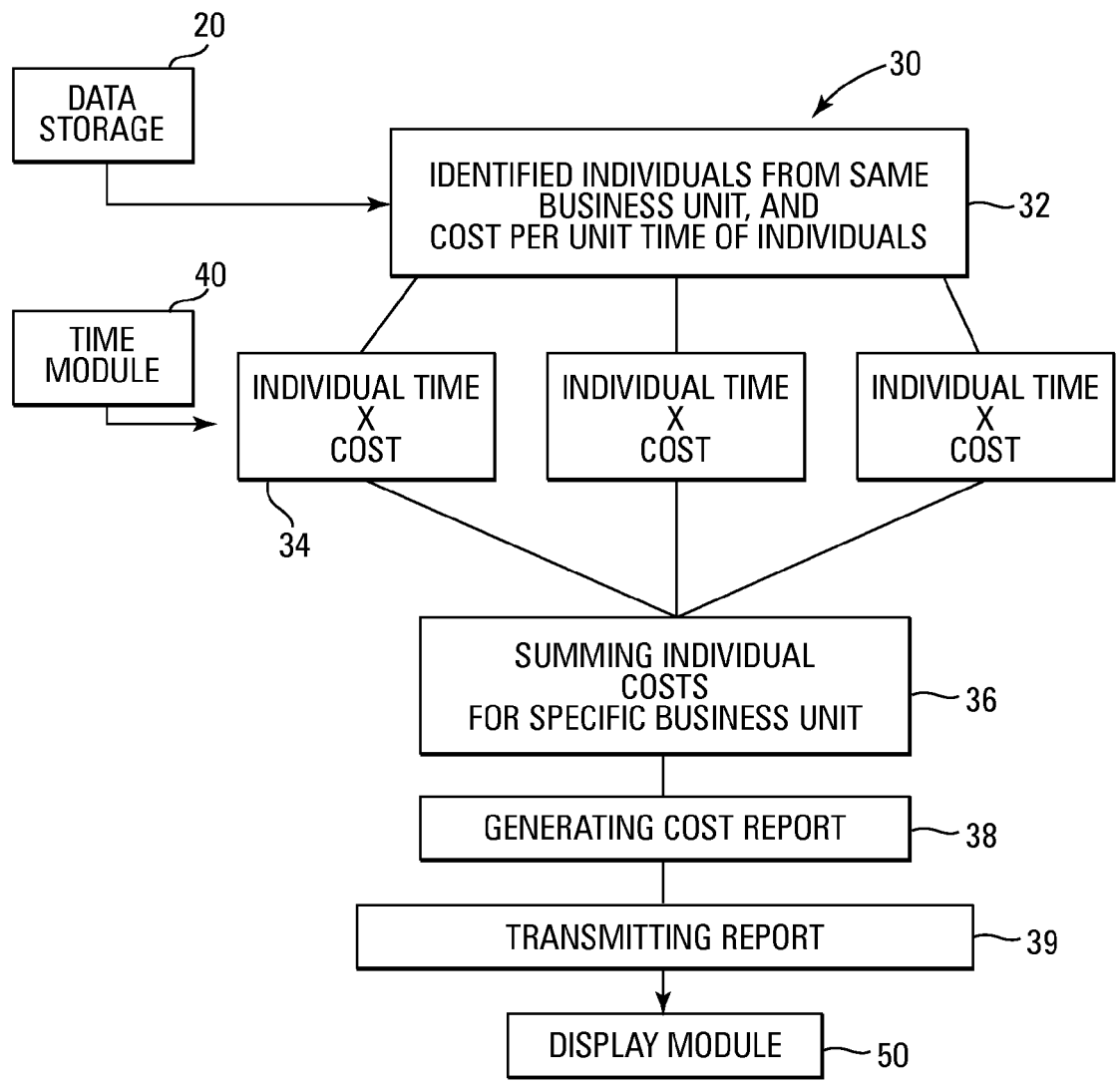
FIG. 2 is a flow diagram of one embodiment of the present invention depicting a method of generating a customized cost report correlating an individual or group's cost at a business meeting to a particular business unit.

A first embodiment depicted in FIGS. 1-2 is the generation of a customized cost report correlating an individual or group's cost at a business meeting to a particular business unit. When the program is initiated 12 data is input automatically or manually 14 and includes at least an actual or nominal currency value per unit time for the identified individual and an identification of the assigned business unit 32. By multiplying the individual cost by the duration of time at the meeting 34 the cost of the meeting in relation to each individual participant is calculated. The cost per individual or group is linked with the corresponding business unit and summed to get a total cost per business unit 36. Based on the calculations a cost report is generated 38 and transmitted 39 to a display module 50.

Figure 3:
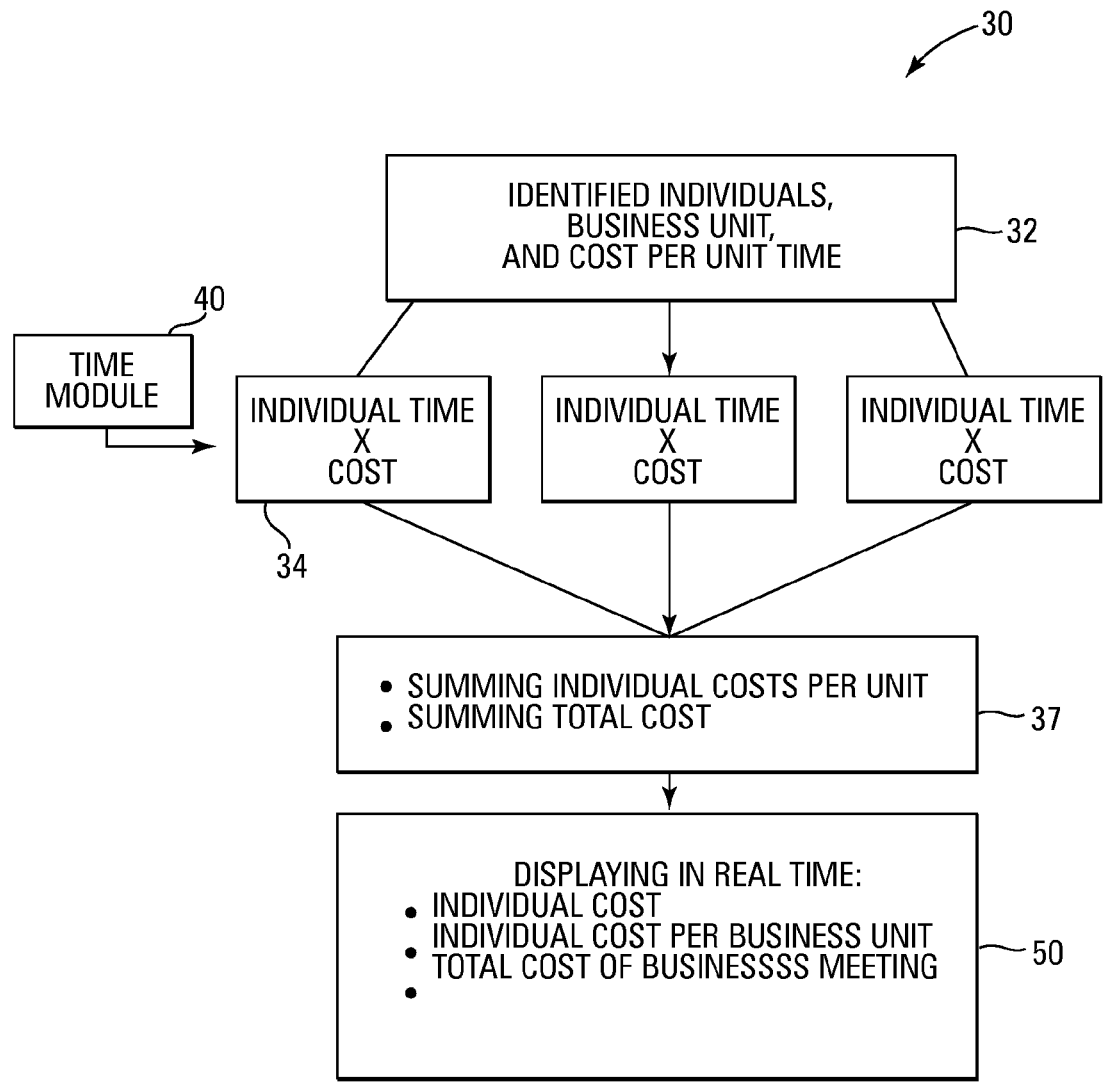
FIG. 3 is a flow diagram of a second embodiment of the present invention wherein the cost of the meeting is displayed in real time.
Figure 4A:
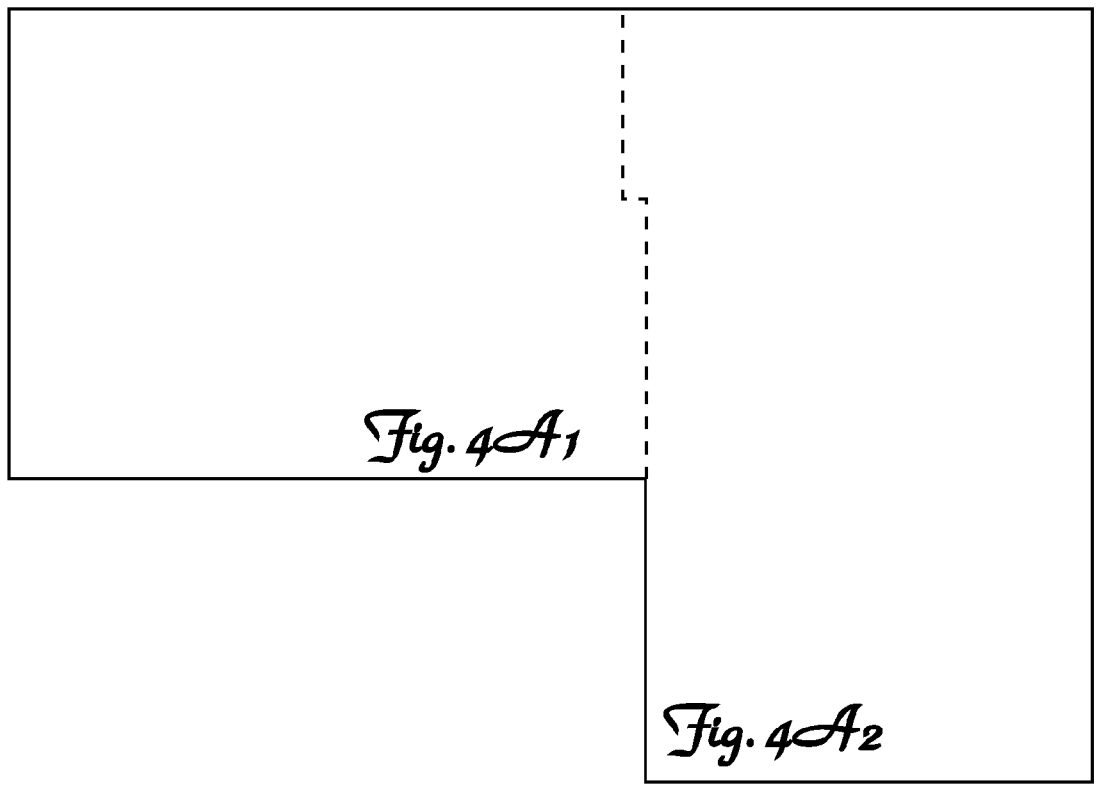
Figure 4B:
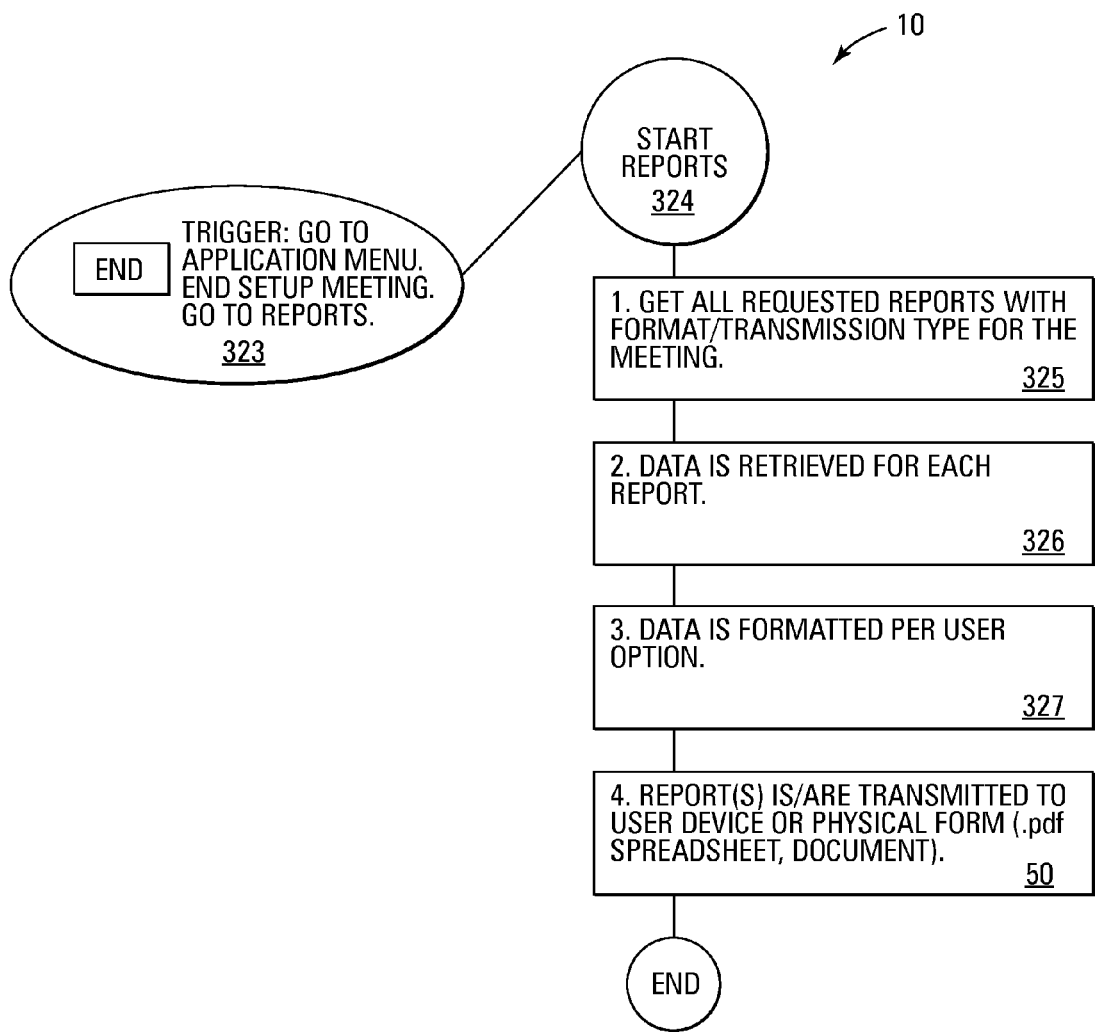

A second embodiment of the present invention 10 depicted in FIG. 3 is a real time display of the cost per individual, business unit and total cost. Data is input which includes at least an actual or nominal currency value per unit time for the identified individual and an identification of the business unit 32 whose accounting records reflect any compensation paid to the identified individual. The duration of time at the meeting is multiplied by the individual's currency value 34. The cost per individual is calculated along with the total cost per business unit and total cost of the entire meeting 37. A cost report unique to each business unit is generated from the calculations made from the input data within the processor module 30. The report is customized to fit each department or particular individual's needs. During the meeting, the real time cost per individual, business unit and/or total cost is displayed on a computer screen located on an apparatus 100 such as a laptop, desktop or hand held device. The refresh rate or rate in which the real time display is updated may be varied by the user. Refresh rates can vary from one minute to one hour depending on the user's needs. As depicted in FIG. 5, allowing the cost reports and real time cost updates to transmit onto an apparatus 100, such as a handheld device, allows monitoring from remote locations thus saving time and money.

As depicted in FIGS. $4_{A1}$ and $4_{A2}$, prior to the beginning of a meeting a user may login certain meeting data into the process module 30 operating on host device or apparatus 100 such as a personal computer, laptop or separate standalone electronic device like a phone, Iphone, Blackberry, or Personal Digital Assistant (PDA). The data entered may include, but is not limited to; the meeting name 301, individual name 302, 304, business unit 303 or currency value 305 entered or drawn from a storage database 306. From the participating individual name 302, 304 the department name, client name or business unit 303 is entered. This is done by either manually entering the data 308 or scanning an ID card 309 or automatically drawing business unit data 307. The participating individual may scan in ID card 309 which automatically enters their professional information 310. Such information may also be entered manually 311. The currency value of the individual 312 is drawn from a storage database 20. A notification alerts the user 313 that a particular participating individual is successfully entered into the process module 30.

Referring to FIG. $4_{A2}$, the time of day 314 and date 322 is drawn from the timer module 20 and activated 315 on the user's initiative. The proceeding steps 316-320 are executed by the process module 30 to calculate the real cost of an individual's attendance at a business meeting and a business unit cost as a whole. The process module draws time intervals 316 from the timer module 40 to show a real time meeting minute total 317. The individual's currency value 312 is correlated with the time to show the individual cost 318 and cost to a business unit 319 based on the number of individuals tied to the particular business unit. The total cost of the business meeting is also calculated 319 and displayed. The transmission of the total cost 320 allows the process module to format the cost report. At the end of the business meeting 321 the user may generate the customized cost report 323.

Referring to FIG. $4_B$, the steps 324-327 are executed by the process module 30 to generate a cost report based on the user's specifications. After the start or initiation of the report function 324 the type of report the user desires is defined 325. All reports are customized to display the type and format most beneficial to the user, business unit or corporation. The desired data drawn from the previous meeting calculations 326 then formatted for the cost report 327. Finally, the specific report is transmitted to a particular display module 50 for viewing.

A sample cost report may list the meeting start and end time. The individual's in attendance are named along with the business title and business unit. The total cost per individual may be displayed along with a total for that particular business unit. Any specialized meeting notes from the meeting may be displayed along with any costs accrued before or after the meeting may be itemized and displayed.

The cost report to may also include: tracking a meeting cost in real time, total dollars per minute of meeting displayed in real time, employee time spent in meetings, meeting costs to be billed interdepartmentally, tracking and billing clients for meeting costs, determining meeting cost prior to meeting and billing late participants for wasted time. The cost reports may be sent via an internet connection and viewed in a human perceptible format which could include a computer screen on a laptop, desktop, electronic handheld device, PDA or the cost report may be printed.

In the present invention 10, the scheduled date, time of day of the meeting, the individuals or groups participating in the meeting and other meeting notes may be manually entered. The data relating to each individual participant is entered or drawn from a storage database 20 located on a main company network within, for example, a Human Resources Department, or other remote database. The data may include the individual or groups name, which department they are associated with, which clients they are associated with, and rate of pay. The currency value for unit time of an individual is designated by that individual's employer or managing agency. It could be an individual or group's rate of pay and may be determined by a corporation salary structure or pay scale. The currency value may be a set value based on a predetermined hourly rate based on an individual's position or job category or a general estimation made by the user. Such information may be stored in a separate storage database 20 and able to be uploaded to the processor module 30 in order to run the necessary calculations. For example, a currency value may be determined in hourly increments based on an hourly wage, a yearly salary divided by the estimated hours worked in a year, an estimate rate of pay based on specific job titles or responsibilities, a billable hourly rate, and the cost of lost manufacturing or production time due to a scheduled meeting. Alternatively, the currency value per unit time may be an hourly fee assigned to the individual, the lost profit or production cost associated with the individual's attendance at the meeting, or the total employment compensation of the particular individual. The total employment compensation is the cost of the individual to the employer taking into account the individual's salary, insurance costs, taxes and daily operational costs.

The storage database 20 will have the ability to store previously entered data to allow a user to more efficiently enter or retrieve the desired information. Additionally, an employee identification card or other forms of employee identification may be linked to the storage database 20 to easily transfer employee information.

FIG. 5 is one embodiment of the present invention wherein the cost report data transferred to, then displayed by an apparatus 100. The cost reports may be distributed to the desired department or user through any physical or electronic form and displayed on a computer screen which may include, but not limited to, any mechanical, digital, or electrical device, PDA, computer, phone, Iphone, web-site, software, E-mail, SMS-texting, IM-instant messaging or cable presently existing and all future mediums for data. Other display examples may include Central server, Web-X, Intranet and NetMeeting. The cost report may be sent via email or text message for easy distribution to appropriate parties within the corporation.

Individual participant's data within the cost reports may be distributed to any particular business unit which is assigned to the specific individual or group. The business unit may be assigned to a specific individual if that particular business unit budget pays that individual's salary. Alternatively, an individual may be assigned to a particular business unit based on the overall corporate structure. An individual may also be assigned to a business unit based on physical location of the individual's office in relation to other departments, or if the individual is performing a task on behalf of the organization.

By separating and linking the meeting cost data to individual business units and distributing user customized cost reports in a variety of forms throughout the separate departments, a corporation may track and budget the cost of meetings for individuals and groups. Reporting the calculated cost of the meeting allows the person responsible for the financial performance of a business department budget to receive in a more timely and efficient manner the data from various business meetings.

The present invention 10 will be able to integrate with separate software programs that store and operate scheduling calendars and contacts lists. For meetings scheduled in a calendar software program, the meeting and all invitees can be displayed. Existing participants are noted with a participant icon (person icon) or a $ icon. The system can automatically add other invitees as participants based on their name, client affiliation, or department information that is included in their contact information previously integrated. The user manually enters in rate information for the new participants. Meeting notes can be displayed in a Notes section, thus integrating all the meeting information into one application.

The foregoing discussion discloses and describes merely exemplary embodiments and aspects of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. An automated cost accounting reporting method for allocating the cost of a meeting, comprising the steps of:
   a) obtaining an electronic device equipped with a processing module, a timing module, an input device and a display device,
   b) obtaining data about individuals attending a meeting and inputting the data into the processing module, wherein the data includes at least;
      i) an identification of each individual,
      ii) a currency value per unit time for each identified individual, and
      iii) an identification of a business unit to which the identified individual is assigned,
   c) timing the duration of each identified individual's actual attendance at the meeting within the timing module,
   d) calculating within the processing module a cost of the business meeting per business unit by (i) multiplying each identified individual's duration of attendance at the meeting by that individual's currency value per unit time to obtain an individual cost, and (ii) summing individual costs for all identified individuals from the same business unit to obtain a business unit cost,
   e) generating at least one cost report containing at least the business unit cost for at least one business unit correlated with an identification of the business unit,
   f) transmitting at least one of the reports to the display module, and
   g) displaying the at least one transmitted report in a human perceptible format.

2. The method of claim 1 further comprising the steps of:
   a) calculating within the processing module a real time cost of the meeting by (i) multiplying each identified individual's duration of attendance at the meeting by that individual's currency value per unit time to obtain a real time individual cost, and (ii) summing individual costs for all identified individuals,
   b) calculating within the processing module a real time business unit cost of the meeting by summing individual costs for all identified individuals from the same business unit to obtain a business unit cost, and
   c) providing a real time display during the meeting of at least one data point selected from the real time cost of the meeting and the real time business unit cost of the meeting, to at least one identified individual in attendance at the meeting.

3. An apparatus comprising:
   a) a processing module,
   b) a timing module,
   c) an input device, and
   d) a display device,
   e) wherein the apparatus is configured and arranged to:
      (i) receive and store data about individuals attending a meeting that includes at least (—) an identification of each individual, (—) a currency value per unit time for each identified individual, and (—) an identification of a business unit to which the identified individual is assigned,
      (ii) time the duration of each identified individual's actual attendance at a meeting,
      (iii) calculate a cost of a business meeting per business unit by (—) multiplying each identified individual's duration of attendance at a meeting by that individual's currency value per unit time to obtain an individual cost, and (—) summing individual costs for all identified individuals from the same business unit to obtain a business unit cost,
      (iv) generate at least one cost report containing at least the business unit cost for at least one business unit correlated with an identification of the business unit,
      (v) transmit at least one of the reports to the display device, and
      (vi) display the at least one transmitted report in a human perceptible format.

4. The method of claim 1 wherein the step of obtaining data about each of the identified individuals is performed by obtaining the data from a computer storage database.

5. The method of claim 1 wherein the currency value per unit time is the per unit time value of the individual's total employment compensation paid by the individual's employer.

6. The method of claim 1 wherein the currency value per unit time is an estimate of the per unit time value of the individual's total employment compensation paid by the individual's employer.

7. The method of claim 1, wherein the step of displaying the at least one transmitted report in a human perceptible format is performed by displaying the at least one transmitted report on a computer screen.

\* \* \* \* \*